United States Patent [19]

Reibert et al.

[11] Patent Number: 5,504,201
[45] Date of Patent: Apr. 2, 1996

[54] PROCESS FOR RECOVERING SALABLE CELLULOSE ETHERS FROM AN AQUEOUS MEDIUM CONTAINING SUCH CELLULOSE ETHERS

[75] Inventors: Kenneth C. Reibert, Baton Rouge, La.; Gregg L. Poppe, Midland, Mich.; John G. Green, Baton Rouge, La.

[73] Assignee: The Dow Chemical Company, Midland, Mich.

[21] Appl. No.: 212,090

[22] Filed: Mar. 14, 1994

[51] Int. Cl.$^6$ .................. C07H 1/06; C07H 1/08
[52] U.S. Cl. .................. 536/84; 536/85; 536/127; 536/128
[58] Field of Search .................. 536/84, 85, 127, 536/128

[56] References Cited

U.S. PATENT DOCUMENTS

| | | | |
|---|---|---|---|
| 2,791,584 | 5/1957 | Anderson. | |
| 2,831,852 | 4/1958 | Savage. | |
| 2,949,452 | 8/1960 | Savage | 536/84 |
| 3,388,082 | 6/1968 | Rodgers, Jr. et al. | 536/84 |
| 4,410,693 | 10/1983 | Gibson et al. | 536/84 |
| 4,456,751 | 6/1984 | Messelt et al. | 536/84 |
| 4,672,113 | 6/1987 | Wallisch et al. | 536/85 |

FOREIGN PATENT DOCUMENTS

| | | |
|---|---|---|
| 0545426 | 12/1992 | European Pat. Off.. |
| 4134662 | 10/1991 | Germany. |
| 4142761 | 6/1993 | Germany. |

*Primary Examiner*—Nathan M. Nutter

[57] ABSTRACT

A process for recovering salable cellulose ether solids in an aqueous slurry from a reactor wherein such cellulose ether solids are produced, or in an aqueous slurry from a centrifuge or filter wherein a portion of the cellulose ether solids from the reactor have been removed, comprising flowing the slurry into a hydraulic cyclone at a temperature above the gel point of the cellulose ether solids in such slurry and under conditions which are tailored to the particular cellulose ether solids in the slurry and to the process by which these have been made.

33 Claims, 4 Drawing Sheets

PROCESS FOR RECOVERING SALABLE CELLULOSE ETHERS FROM AN AQUEOUS MEDIUM CONTAINING SUCH CELLULOSE ETHERS

The present invention relates to processes for the recovery of salable materials from streams containing such materials, and more particularly to processes for recovering salable materials from a wastewater stream to a biological wastewater treatment facility.

Cellulose ethers are generally produced by reacting cellulose, an alkali metal hydroxide and at least one etherifying agent in an aqueous medium which optionally contains one or more organic solvents. The crude solid cellulose ether product is generally washed from the reactor with hot water at a temperature above the gel or flocculation point of the cellulose ether product (to keep the desired cellulose ethers from going into solution), and passed as an aqueous slurry of hot water-insoluble cellulose ether solids into a conventional solids separation device, for example, a centrifuge or filter wherein additional wash water may be added.

Washed, hot water-insoluble cellulose ether product is then passed to a dryer, while the aqueous wash medium separated from the hot water-insoluble product in the centrifuge or filter generally contains hot water-soluble cellulose ethers and or macromolecular cellulose ether by-products, salt and organic by-products such as methanol, ethanol, dimethyl ether and/or diethyl ether, ethylene and diethylene glycol, propylene, dipropylene and tripropylene glycols and their corresponding glycol ethers. A substantial amount of the desired hot water-insoluble cellulose ether product is also carried through into the aqueous wash medium unrecovered.

In conventional processes the aqueous wash medium may be passed directly to a biological wastewater treatment facility. Unfortunately, the cellulose ethers are not especially biodegradable and act as surfactants in biological wastewater treatment, so that where the aqueous wash medium comprises a large enough portion of the total wastewater to be treated in a plant, foaming problems, poor settling of the biomass or flotation and loss of the biomass can occur. An antifoaming agent can be added to combat these problems, but antifoaming agents can be relatively expensive. Further, significant value is lost in unrecovered salable cellulose ethers in the reaction and washing media.

Particularly because of the value to be gained thereby, several processes and apparatus have been recently developed to recover hot-water insoluble cellulose ether product carried over with the aqueous wash medium.

German Offenlegungschrift DE-A-41 34 662 is exemplary, and describes a method wherein cellulose ethers and other cellulose derivatives are separated from an aqueous wash medium by initially passing the wash medium into a settling tank at a temperature in excess of the gel or flocculation point of the particular cellulose derivative. Non-settled cellulose derivative is removed by centrifugal separation in a cyclone (and preferably a hydraulic cyclone (commonly also known as a "hydroclone")) or by flotation, and recycled back to the settling tank. The solution from the hydroclone is thereafter cooled to a temperature below the gel point and subjected to membrane filtration, especially ultrafiltration through a poly(vinylidene fluoride) membrane. The concentrate obtained therefrom is heated above the gel point before being recycled to the settling tank, whereas the permeate is "canalized" and presumably sent to a biological wastewater treatment facility.

One difficulty with the process and apparatus proposed in the DE '662 application is that the concentrate from the membrane filtration step contains water-soluble cellulose ethers as well as organic and inorganic impurities like salts which are not desired, and which would preferably not be recycled to the settling tank.

Other processes are also described in the art. For example, European Patent Publication EP 0 545 426 A2 describes a process involving ultrafiltration of the reaction or wash medium at a temperature in excess of the gel temperature, and subjecting the organic species (inclusive of the hot water-soluble cellulose ethers) in the resulting concentrate to oxidative degradation to improve their biodegradability, followed by biological treatment. U.S. Pat. No. 4,672,113 suggests distillation followed by ultrafiltration through a polyether sulfone membrane.

None of these processes have proven completely satisfactory in effectively recovering desired cellulose ether solids from the aqueous wash or reaction media without at the same time creating additional problems, and in concurrently addressing the effects of the wastewater produced by such processes on a biological wastewater treatment facility.

SUMMARY OF THE INVENTION

The present invention is thus directed in one aspect to a novel and improved process for recovering salable cellulose ether solids in an aqueous slurry from a reactor wherein such cellulose ether solids are produced, or in an aqueous slurry from a centrifuge or filter wherein a portion of the cellulose ether solids from the reactor have been removed, comprising flowing the slurry into a hydraulic cyclone at a temperature above the gel point of the cellulose ether solids in such slurry and under conditions which are tailored to the particular cellulose ether solids in the slurry and to the process by which these have been made.

The "gel point" of these cellulose ether solids, for purposes of the present invention, corresponds to the "incipient precipitation temperature" of the cellulose ether solids as determined by a procedure generally as described in Sarkar, "Thermal Gelation Properties of Methyl and Hydroxypropyl Methylcellulose", Journal of Applied Polymer Science, Vol. 24, 1073–1087 (1979) at page 1076.

According to this procedure, a 0.5 weight percent aqueous solution is prepared by dispersing the cellulose ether solids in a small amount of hot water, adding the remainder as cold water and stirring in a 0 deg. C. bath for about 1 hour, then storing at about 4 deg. C. for at least about 24 hours. After storage, the solution is sealed in a 12 mm. outside diameter (OD), 10 mm. inside diameter (ID) by 75 mm long cuvette, with the cuvette being placed in turn within a 0.5 inch diameter, 3 inch long cavity in the center of 2.5 inch diameter, 4.25 inch long cylindrical aluminum block. Copper tubing (0.25 inch OD) bearing water from a constant-temperature bath (employing a temperature programmer) is wound around the aluminum block. Two 24 inch long, 3/16 inch diameter flexible fiberglass light guides are placed at the ends of the cuvette through the aluminum block, making sure that the light guide tips are aligned and perpendicular to the cuvette. The other ends of the light guides are connected to a colorimeter providing 450 nm light. The temperature of the cellulose ether solution is measured by placing a thermocouple in the aluminum block close to the cuvette, and the light transmission of the cuvette measured as a function of temperature (at a rate of increase of 0.5 deg. C./minute). The temperature at which the percent light transmission is reduced to 97.5 percent of the original value is taken as the incipient precipitation temperature or "gel point".

In one embodiment of the present invention, the process is tailored to the cellulose ether solids in the slurry and to the particular process by which these have been made, by applying a pressure to the slurry to achieve a pressure drop across the hydraulic cyclone which is selected based on the difference in the densities of the hot water-insoluble cellulose ether solids in the slurry and the less-dense aqueous liquid portion of the slurry, and which may be selected in practical terms based on the bulk dry solid density of the cellulose ether solids produced by a given process.

In another embodiment, dilution water is added to the slurry prior to its entry into the hydraulic cyclone to increase the density difference between the liquid portion of the slurry and the cellulose ether solids contained therein while also increasing the temperature of the slurry.

In still another embodiment, the salt concentration of the liquid portion of the slurry is increased to "salt out" a portion of the hot water-soluble cellulose ethers contained in such liquid, while applying some added pressure to the slurry to compensate for the accompanying reduced density difference between the liquid portion of the slurry and the undissolved cellulose ethers contained in such slurry.

In this regard, although the densities of the various commercial grades of cellulose ether solids in their corresponding aqueous reaction or wash media per se are not known, it is known because of their common tendency to settle out of such media that they each possess a density in a corresponding reaction or wash medium that exceeds the density of the aqueous, salt-containing liquid portion of the medium.

Thus, a commercially-available, Methocel™ Grade "J" hydroxypropyl methylcellulose ether (The Dow Chemical Company) having a bulk dry solids density of 0.60 grams/$cm^3$, from 16.5 to 20 weight percent of methoxyl substituents and from 23 to 32 weight percent of hydroxypropyl substituents, settles out of a reaction or wash medium having a density of 1.03 grams per cubic centimeter (at about 8 weight percent of NaCl in water). So too does a commercially-available, Methocel™, Grade "K" hydroxypropyl methylcellulose ether (The Dow Chemical Company) having a bulk dry solids density of 0.25 grams/$cm^3$, from 19 to 24 weight percent of methoxyl substituents and from 7 to 12 weight percent of hydroxypropyl substituents, in a slurry whose liquid, brine portion has a density of 1.08 grams per cubic centimeter (at about 14 weight percent of NaCl in water).

With respect to these two commercially-available cellulose ethers and as reflected in the Examples which follow, the "J" product, with a demonstrably greater bulk dry solids density (and presumably a somewhat greater density in the slurry) and a lower density liquid slurry portion, is recovered in hydroclone at a higher efficiency than the "K" product at the same pressure drop and without the addition of dilution water to the "K" product's slurry. Adding dilution water to the slurry going into a hydroclone depresses the salt concentration in and density of the liquid portion of the slurry, and in so doing increases the density difference between the hot water-insoluble cellulose ether solids in the slurry and the liquid portion of the slurry.

In another, further aspect of the invention, a treatment is performed, for example, on the overflow from the hydraulic cyclone for reducing or eliminating the surfactant-like effects of the materials contained therein in a biological wastewater treatment process, and optionally for the additional purpose of reducing the total oxygen demand of the overflow in a biological wastewater treatment process.

DETAILED DESCRIPTION OF THE PREFERRED EMBODIMENTS

There are a number of possible arrangements by which a process of the present invention may be carried out. Four preferred arrangements are illustrated schematically in FIGS. 1–4, and will be described in detail below.

By way of background, the use of a hydraulic cyclone to separate hot water-insoluble cellulose ether solids from an aqueous wash medium is known in combination with ultrafiltration of the overflow from such hydraulic cyclone, see the above-described German Offenlegungschrift DE-A-41 34 662. In the present invention, the ultrafiltration step of the DE '662 application is preferably omitted (per FIGS. 1–4), and the conditions of operation of the hydraulic cyclone are adjusted instead to achieve a more economical recovery of the particular, salable hot water-insoluble cellulose ether solids in a given slurry.

In this regard, in a hydraulic cyclone a centrifugal separation of the slurry solids from the liquid portion of the slurry is achieved by feeding the slurry tangentially into the hydraulic cyclone under pressure. The efficiency with which the solids are separated out depends on the difference in the densities of the solids to be recovered and the liquid in which these solids are carried, and on the angular velocities and thus the centrifugal forces generated in the hydraulic cyclone.

Figure 1:
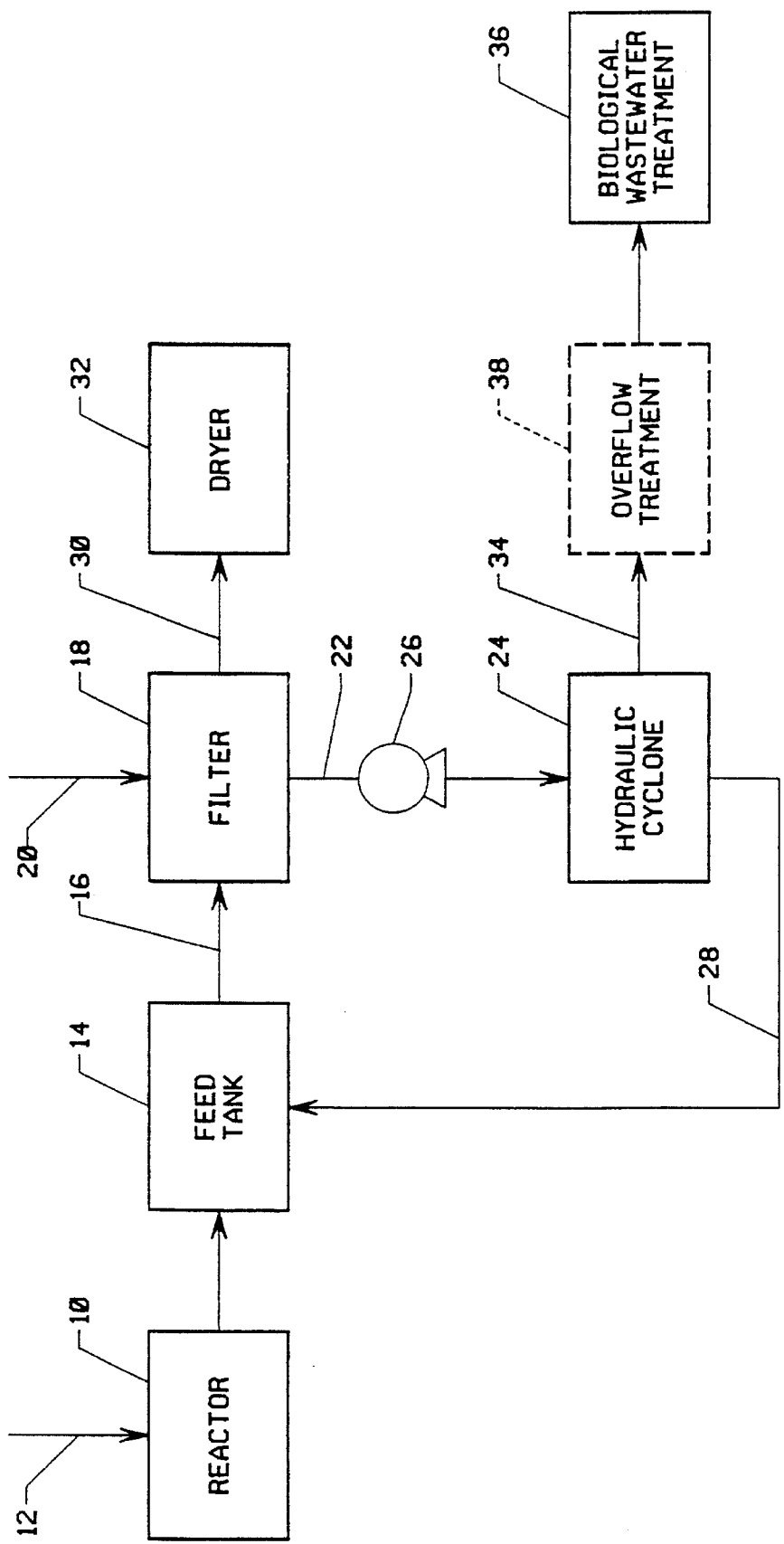
FIG. 1 is a schematic illustration of a process of the present invention in a first embodiment.
Figure 3:
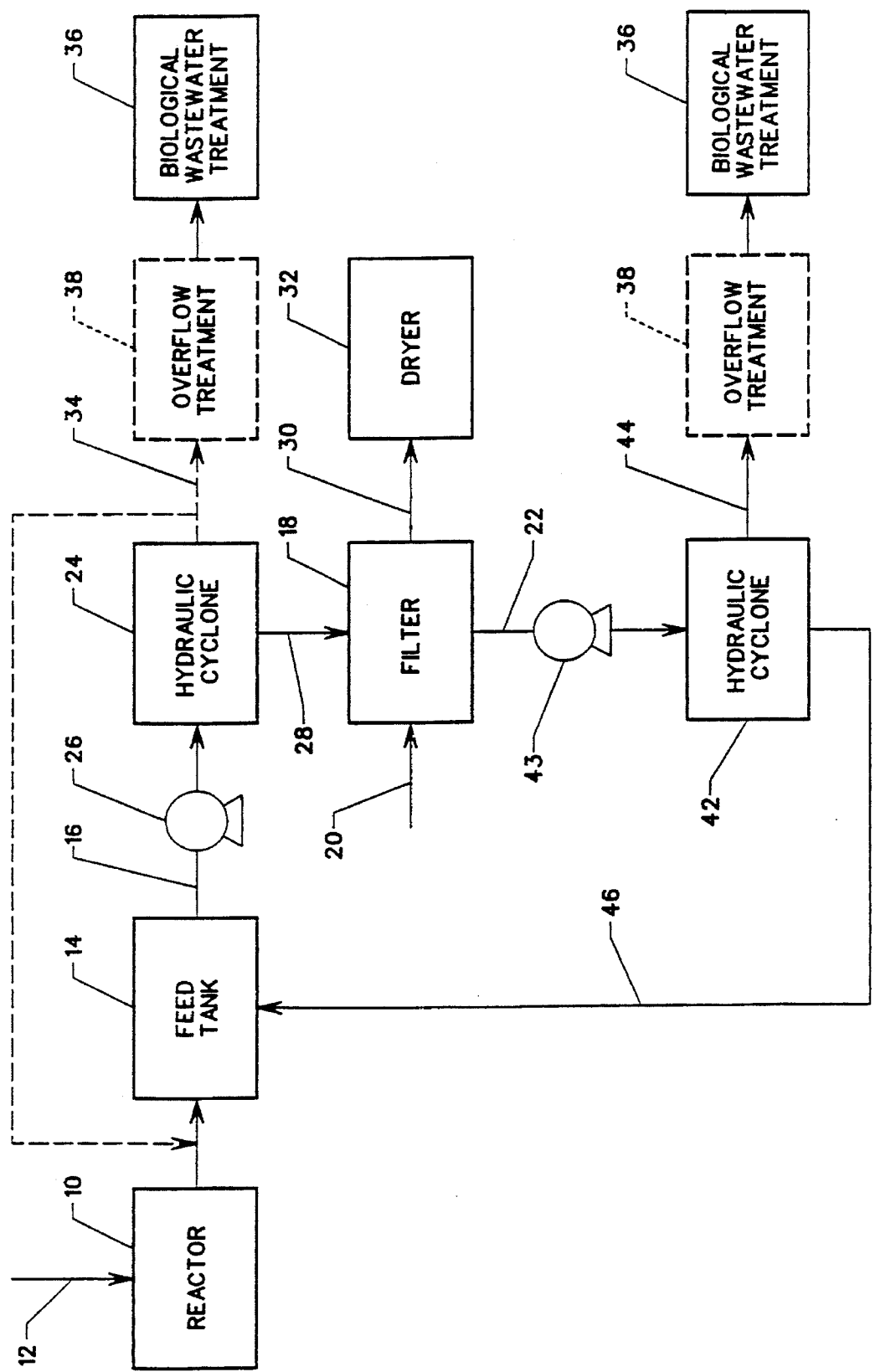
FIG. 3 is a schematic illustration of a process of the present invention in a third embodiment.

The present invention is thus concerned in one embodiment with improving the solids recovery in the hydraulic cyclone by pumping the cellulose ether solids-bearing slurry from a reactor (the aqueous reaction medium) or from a centrifuge, filter or the like (the aqueous wash medium) into the hydraulic cyclone at higher pressures and a corresponding selected, greater pressure drop, and consequently at greater velocities and greater centrifugal forces (see FIGS. 1 and 3, and corresponding detailed descriptions thereof below).

In another fundamental embodiment which has been briefly summarized above, the separations efficiency of the hydraulic cyclone is improved at a given pressure drop by adding dilution water to lower the density of the salt-containing liquid portion of the slurry, and in so doing to increase the density difference between the liquid portion of the slurry and the salable cellulose ether solids to be recovered therefrom (see FIGS. 2 and 4), while increasing the temperature of the slurry. Or, a combination of increasing the pressure drop across the hydroclone and of adding dilution water may conceivably be employed to increase the solids separation efficiency of the hydroclone.

A factor that bears mentioning with respect to the addition of dilution water to the slurry, is the interrelationship of salt concentration in the liquid phase of the slurry and the gel temperature of the cellulose ethers in the slurry. In this regard it is well known that the gel temperature is in inverse relationship to the concentration of electrolytes (e.g., NaCl) in the liquid phase, so that for a given cellulose ether product it is expected that there will be an optimum salt concentration in the liquid phase of the slurry which maximizes the density difference between the liquid phase of the slurry and the hot water-insoluble cellulose ether solids contained therein, while minimizing the amount of formerly solid cellulose ether product which dissolves at the reduced salt concentrations occasioned by the addition of dilution water to the slurry. The dissolution of this formerly solid cellulose ether product is mitigated to an extent by increasing the overall temperature of the slurry.

A final alternate approach which has been specifically mentioned previously would involve increasing the salt concentration of the liquid portion of the slurry to precipitate a portion of the formerly dissolved cellulose ether product, while increasing the pressure drop across the hydroclone to compensate for the accompanying reduced density difference between the liquid phase of the slurry and the hot water-insoluble cellulose ethers contained therein.

The selection of a particular one of these methods and the optimal degree to which the slurry is pressurized, diluted with dilution water or pressurized and diluted with dilution water, or "salted out" by the addition of salt in one form or another will be determined by a number of factors, including the incremental additional solids recovery to be realized with a given increase in pressure, a given increase in the amount of dilution water added or a given increase in salt levels in the liquid phase of the slurry, the added equipment and operating costs associated particularly with these increased pressures or flows of dilution water, and the effect of not recovering an incremental amount of the cellulose ether solids on a biological wastewater treatment plant (in the absence of an optional treatment of the overflow to ameliorate or substantially prevent the adverse surfactant-like effects of the overflow on a biological wastewater treatment process).

The process of the present invention in any of these embodiments however represents an important stage in a large-scale production process for cellulose ethers. Processes for the production of cellulose ethers are well known in the art and described, for example, in U.S. Pat. Nos. 2,831,852, 2,949,452, 3,388,082, 4,410,693 and 4,456,751.

Well-known nonionic cellulose ethers are, for example: $C_{1-2}$-alkyl cellulose ethers such as methylcellulose ethers and ethylcellulose ethers; hydroxy-$C_{2-4}$-alkyl $C_{1-2}$-alkyl cellulose ethers such as hydroxypropyl methylcellulose ethers, hydroxypropyl ethylcellulose ethers, hydroxybutyl methylcellulose ethers, hydroxyethyl methylcellulose ethers and hydroxyethyl ethylcellulose ethers; and hydroxy-$C_{2-4}$-alkyl cellulose ethers such as hydroxyethyl cellulose ethers, hydroxypropyl cellulose ethers and hydroxybutyl cellulose ethers. Cellulose ethers can also contain a lower amount, especially up to about 25 percent by weight, of ionic substituents, for example, carboxy-$(C_{1-2})$-alkyl groups, N,N-di$(C_{1-3})$-alkyl-amino$(C_{1-4})$-alkyl groups, phosphonomethyl or sulfonoethyl groups.

The process of the present invention is particularly useful in the large scale production of methylcellulose ethers and hydroxypropyl methylcellulose ethers, but is not limited to the production of these cellulose ethers alone.

Referring now to the drawings, cellulose ether manufacturing processes are illustrated schematically which incorporate the process of the present invention in one of four embodiments. In FIG. 1, for example, cellulose is first reacted with an aqueous alkali hydroxide in reactor 10 to produce an alkali cellulose. The alkali cellulose reacts with one or more etherifying agents which can be from the alkyl halides such as methyl chloride or ethyl chloride, the alkylene oxides such as ethylene oxide, propylene oxide or butylene oxide, or from the dialkyl sulfates such as dimethyl sulfate or diethyl sulfate. The process is usually conducted in an aqueous medium which may contain one or more water-miscible solvents, e.g., alcohols such as methanol, ethanol, isopropanol or tertiary-butanol, glycols such as propylene glycol, ethylene glycol or butylene glycol, glycol mono- or diethers such as the methyl or isopropyl mono- or diethers of propylene, ethylene or butylene glycol, chlorinated solvents such as methylene chloride, or acetone, dimethoxyacetone or mixtures of acetone and dimethoxyacetone.

After completion of the reaction, the crude cellulose ether that is produced is flushed from the reactor 10 by a stream 12 of hot water, producing in a stirred feed tank 14 an aqueous reaction medium or slurry 16.

The aqueous reaction medium 16 is maintained at a temperature above the gel point of the hot water-insoluble cellulose ethers, is preferably maintained at a temperature of from about 70 to about 100 degrees Celsius, and most preferably is maintained at a temperature of from about 90 to 95 degrees Celsius. Temperatures higher than 100 degrees Celsius may be used if pressure is applied to prevent boiling of the medium 16. The medium 16 is passed at these temperatures from the feed tank 14 into a primary solids separation apparatus 18 which as suggested in the drawings is conventionally and preferably a filter (e.g., a table filter) or centrifuge, wherein the desired hot water-insoluble cellulose ether solids are separated from the reaction medium 16.

Typically and preferably, additional hot wash water 20 (at a temperature above the gel point, and preferably being at about 90 degrees Celsius or greater) is employed in the apparatus 18 for removing to an aqueous wash medium 22 (from apparatus 18) any remaining salts, residual alkali hydroxides, hot water-soluble cellulose ethers and/or macromolecular cellulose ether by-products (e.g., those compounds derived from cellulose, hemicelluloses and fibers of low or uneven substitution or unreacted cellulose), and any organics which may be formed as by-products of the reaction depending on the chosen alkylation agents, reaction temperatures, etc. These organic by-products may include methanol, ethanol, dimethyl ether and/or diethyl ether (in reactions conducted with methyl chloride or ethyl chloride), ethylene glycol, diethylene glycol, propylene glycol, dipropylene glycol and the ethers derived from these glycols (in hydroxyalkylation with alkylene oxides). The aqueous wash medium 22 proceeding from the apparatus 18 also contains, as previously noted, significant as-yet-unrecovered quantities of the desired hot water-insoluble cellulose ethers.

"Hot water-soluble" in the preceding paragraph (and as used elsewhere herein) means these cellulose ether compounds do not have a gel point, even at a temperature of above 80 degrees Celsius. Hot water-insoluble correspondingly refers to or describes compounds which have a gel point or flocculation temperature between about 45 degrees Celsius and about 85 degrees Celsius.

The aqueous wash medium 22 from the primary solids separation apparatus 18 is then passed into the hydraulic cyclone 24 while still maintaining a temperature in excess of the gel point and preferably being from 90 to 95 degrees Celsius, using a pump 26 to bring the medium 22 to an elevated pressure and to generate greater centrifugal force in the hydroclone 24 for achieving a greater recovery of the desired hot water-insoluble cellulose ether solids in the medium 22.

The pressure to be added by pump 26 will depend, as already noted, on the magnitude of the density difference between the density of the cellulose ether solids in the medium 22 and the density of the liquid portion of the slurry medium 22, the amount of solids that can be recovered by the realization of an increased pressure drop across the hydroclone 24, and the equipment and energy expense associated with applying a given pressure to medium 22 via pump 26. In this regard, the density of particular cellulose ether solids in the medium 22 is not readily determinable, as indicated above. It is expected as a general rule, however, that significant differences in the bulk dry solids densities of the various desired cellulose ether solids will be reflected in corresponding density differences between the cellulose ether solids in the slurry, and in the comparative ease or difficulty of separating out these materials from an aqueous medium 16 or 22.

Returning now to FIG. 1, the underflow 28 from the hydraulic cyclone 24 (containing the hot water-insoluble cellulose ether solids recovered from aqueous wash medium 22 in the hydroclone 24) is recycled back to the stirred feed tank 14 for recovering these solids in apparatus 18, while the solids from apparatus 18 are continuously sent in product stream 30 to a dryer 32 according to conventional practice. The overflow 34 from the hydroclone 24, containing residual, unrecovered higher molecular weight hot water-insoluble cellulose ether solids, hot water-soluble cellulose ethers and macromolecular cellulose ether by-products, salts and organic by-products, is passed directly to a conventional biological wastewater treatment process 36 or is optionally treated via an overflow treatment process 38 before being fed to the biological wastewater treatment process 36.

The overflow treatment process 38 reduces or substantially eliminates the surfactant-like effect of the hot water-soluble cellulose ethers and residual, unrecovered hot water-insoluble cellulose ether solids in overflow 34 in the biological wastewater treatment process 36, so that the foaming problems, poor settling of the biomass or flotation and loss of the biomass that can occur in the absence of such a treatment process 38 can be ameliorated or substantially avoided without requiring the use of expensive antifoaming agents. Selected, oxidative-type overflow treatment processes 38 can also reduce the total oxygen demand (TOD) of the overflow 34 where this is desirable.

Where reduction of the TOD of the overflow 34 is not required, the overflow treatment process 38 can consist in one embodiment of acid hydrolysis of the overflow 34, whereby the cellulose ethers in overflow 34 are converted to lower molecular weight, substituted one- and two-ring sugar molecules which do not behave as surfactants in the wastewater treatment process 36. Preferably by this process the overflow 34 is acidified in a batchwise or continuous, plug flow-type process to a pH of about 2 or less using a suitable mineral acid, e.g., hydrochloric acid, then heated to a temperature of from about 100 degrees Celsius to about 300 degrees Celsius (conveniently accomplished in a continuous process by direct steam injection) and maintained at such temperature for a period of from about 5 minutes up to about 1 hour. The acid hydrolyzed overflow 34 is then neutralized and cooled before being passed to the wastewater treatment process 36. Most preferably the acid hydrolysis of the overflow 34 occurs at a temperature of about 150 degrees Celsius and a pH of about 1.0 over a period of about an hour, with lower pH's resulting in the formation of materials such as propionaldehyde and 1,3,5-trimethylbenzene which can adversely affect the wastewater treatment process 36 if not removed in some fashion (see below) from the hydrolyzed overflow 34.

An added benefit of the acid hydrolysis process may be realized in the conversion of water-soluble and nonvolatile organic materials contained in the overflow 34, namely methanol, the glycols and their corresponding glycol ethers, to relatively insoluble and/or volatile materials which can be removed from the acid hydrolyzed overflow 34, as by distillation or extraction. Some of these materials may be useful as organic intermediates (e.g., methyl chloride, 1,3,5-trimethylbenzene, other alkylaromatics and higher aromatics), or the removal of these materials can be effected as a non-oxidative route for reducing the TOD of the overflow 34 before it is fed to the biological wastewater treatment process 36.

Other less preferred processes 38 are known which may be used to reduce or substantially eliminate the surfactant-like effect of the overflow stream 34. These can include, for example, simple adsorption of the cellulose ethers contained in the overflow 34 in a suitable absorbent (e.g., bentonite clay) or ultrafiltration. A reduction in the TOD of the wastewater from these processes 38 can be effected, for example, by steam stripping prior to treatment in a conventional biological wastewater treatment process 36.

Alternatively, oxidative processes 38 can be employed for converting the cellulose ethers in stream 34 to lower molecular weight materials which do not possess the surfactancy of the cellulose ethers in biological wastewater treatment, and for also reducing the TOD of the wastewater which is fed to a biological wastewater treatment process 36. These can include, for example, oxidative degradation of a type described in the earlier-cited European Patent Publication EP 0 545 426 A2 (using hydrogen peroxide and/or ozone with ultraviolet light), chlorinolysis, wet air oxidation (involving heat treatment at 200 to 300 degrees Celsius and 700 to 750 pounds per square inch, with compressed air addition), catalytic wet oxidation or oxidative acid hydrolysis (involving a combination of pure oxygen addition, elevated temperatures and pressures, and reduced pH). Of all of the foregoing conventionally known processes 38, acid hydrolysis is presently preferred.

Figure 2:
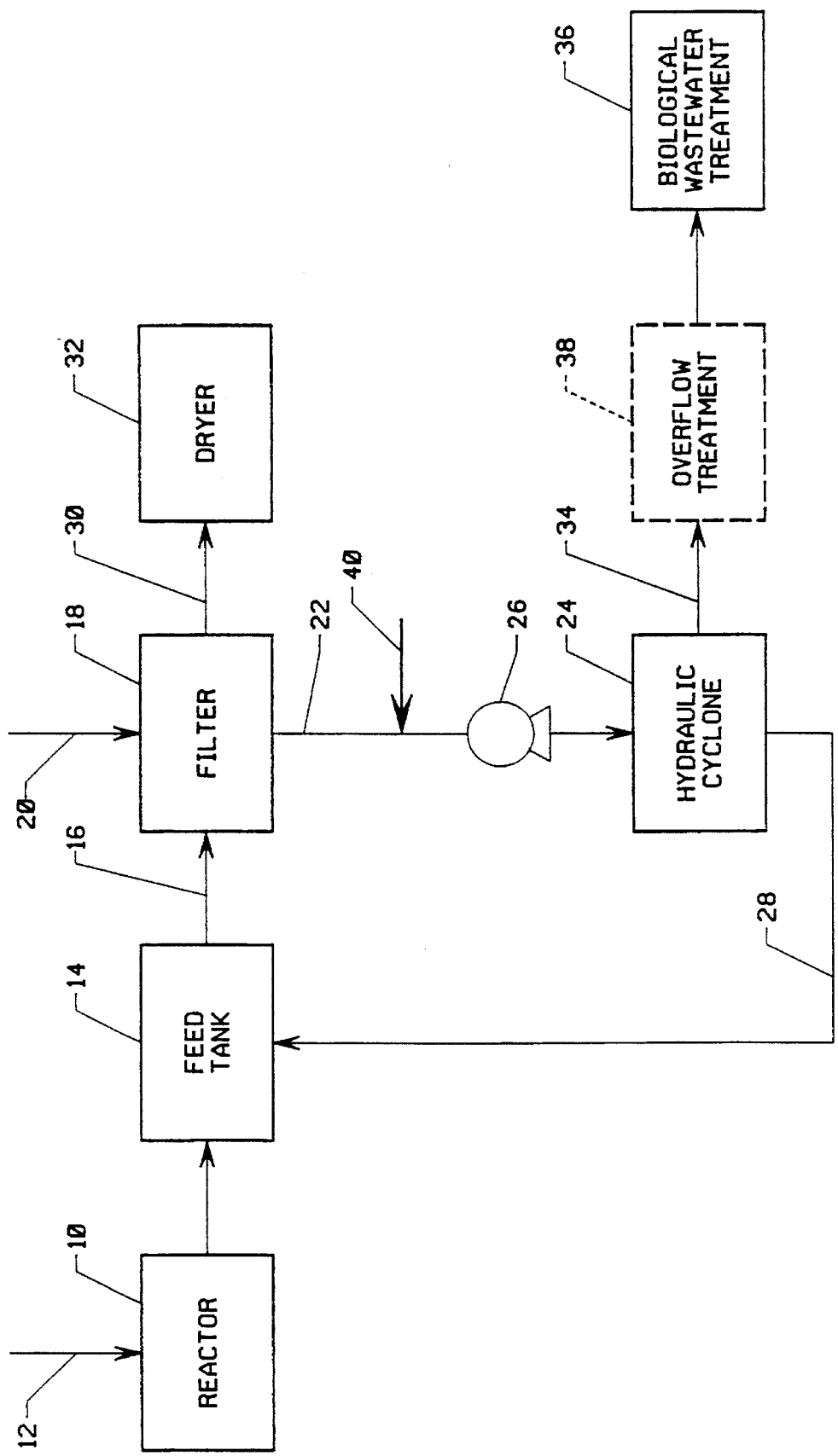
FIG. 2 is a schematic illustration of a process of the present invention in a second embodiment.

The process of FIG. 2 is essentially similar to the process of FIG. 1, except that instead of the pressure drop in the hydroclone 24 being selected to provide an optimal recovery of the hot water-insoluble cellulose ether solids therefrom, hot dilution water (90 degrees Celsius or greater) is added to the aqueous wash medium 22 upstream of the pump 26 and hydroclone 24 via a stream 40. The optimal amount of dilution water to be added depends as noted above on the incremental additional cellulose ether solids recovery to be realized, the expense of dealing with unrecovered cellulose ether solids in a biological wastewater treatment process 36 or overflow treatment process 38 and the added equipment and operational expense associated with a larger capacity hydraulic cyclone, for example. The dilution water is preferably process water that has been passed through an ion exchange resin bed to exchange sodium ions for magnesium and calcium ions in the process water associated with scale formation.

Figure 4:
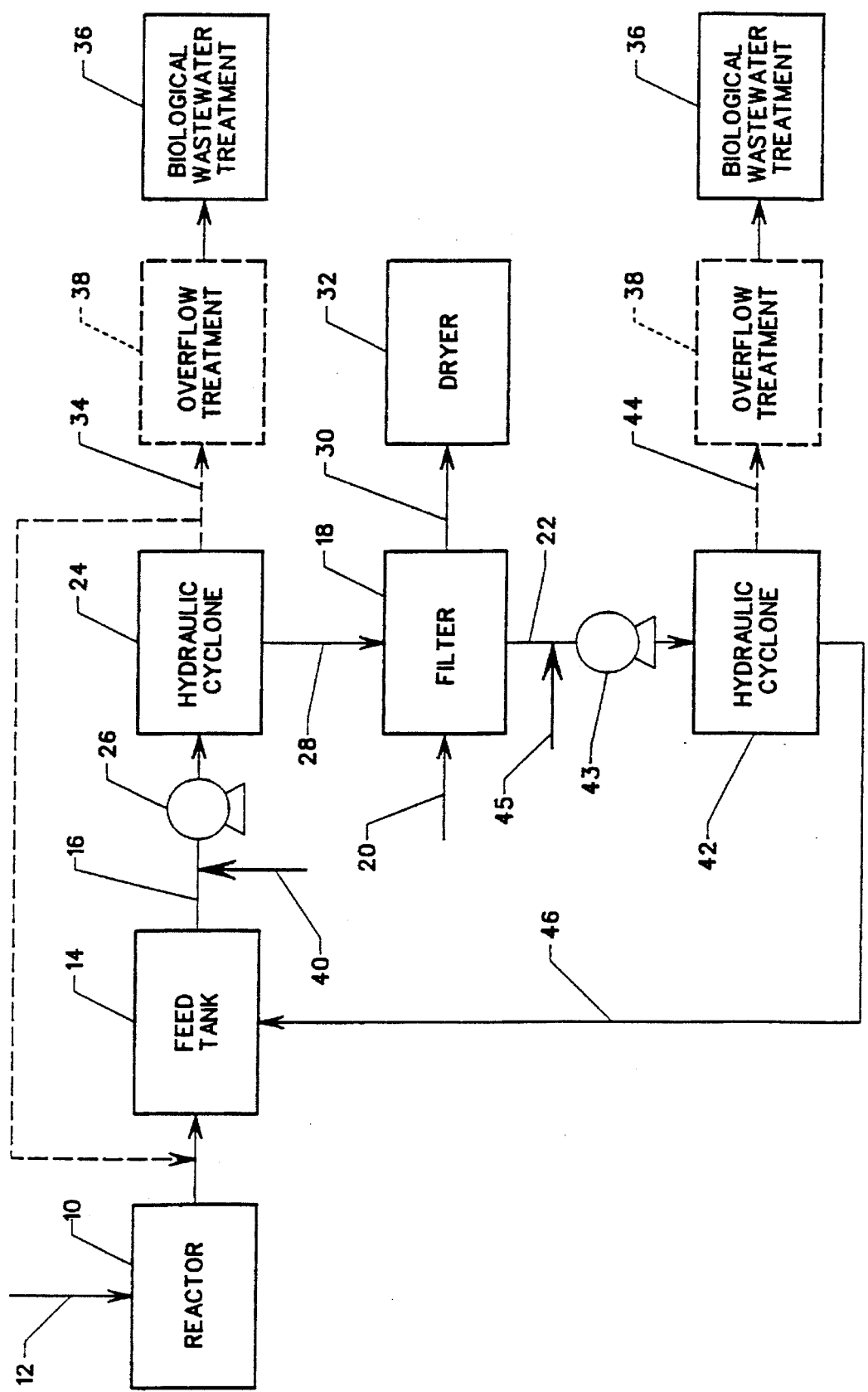
FIG. 4 is a schematic illustration of a process of the present invention in a fourth embodiment.

The processes of FIGS. 3 and 4 differ from the corresponding processes of FIGS. 1 and 2, respectively, in the addition of a second hydraulic cyclone 42. The first hydraulic cyclone 24 in each of these processes is positioned between the feed tank 14 and the primary solids separation apparatus 18, and the overflow 34 from this first hydraulic cyclone 24 is preferably passed to a biological wastewater treatment process 36 or to an overflow treatment process 38 followed by the biological wastewater treatment process 36, or is recycled in part to the feed tank 14 to make up the aqueous reaction medium 16.

The underflow 28 from the first hydrocyclone 24 is passed on to the primary solids separation apparatus 18, with hot wash water 20 being added therein to produce product stream 30 and aqueous wash medium 22. Product stream 30 is dried in dryer 32, and aqueous wash medium 22 is passed to the second hydroclone 42 at a selected elevated pressure via a pump 43 (FIG. 3) or with the addition of dilution water in stream 45 prior to the pump 43 and hydroclone 42 (FIG. 4). The overflow 44 from the second hydroclone 42 is thereafter passed to a biological wastewater treatment process 36 (preferably combining with any portion of the overflow 34 from the first hydroclone 24 directed to such a process 36), or to an overflow treatment process 38 and biological wastewater treatment process 36 in combination. The underflow 46 from the second hydraulic cyclone 42 is recycled back to the stirred feed tank 14.

The insertion of a hydraulic cyclone between the feed tank 14 and the primary solids separation apparatus 18 in the processes of FIGS. 3 and 4 enables the load on the dryer 32 to be reduced in such processes, as compared to processes configured as in FIGS. 1 and 2 and omitting the hydraulic cyclone.

Finally, those embodiments wherein salt is in one form or another (i.e., as a solid, or as a brine solution in water) added to the slurry instead of dilution water are essentially configured as in FIGS. 2 and 4, with, however, the dilution water streams 40 and 45 referenced above being salt-bearing streams 40 and 45.

The present invention is more particularly illustrated by the examples which follow:

Examples 1–13

For these examples, a hydraulic cyclone (Krebs Uniclone™ Model PCI-1181, Krebs Engineers, Menlo Park, Calif.) was installed in a cellulose ether production plant to receive aqueous wash media produced in the manufacture of several Methocel™, Grade "J" hydroxypropyl methylcellulose ethers (The Dow Chemical Company) of varying viscosities, from a table filter of the type described above and designated as "18" in the accompanying FIGS. 1–4. The liquid portion of the various aqueous wash media was empirically determined to possess a density of approximately 1.03 grams per cubic centimeter (corresponding to a sodium chloride content of about 8 percent by weight).

The temperatures and solids concentrations of the wash media were measured going into the hydraulic cyclone. A pump was used to achieve various pressure drops across the hydraulic cyclone, and the percentage recovery of the product (determined to be within specifications for salable, prime product) in the underflow (with respect to the amount of hot water-insoluble cellulose ethers fed to the hydroclone) measured as a function of pressure drop.

The results from these runs are shown in Table 1 below:

TABLE 1

| Product Type | Pressure Drop (lbs/in$^2$) | Pct. Recovery | Feed Temp. (Deg. C.) | Feed Conc. (Wt. % Solids) |
|---|---|---|---|---|
| J-12M[a] | 25 | 91.0 | 85 | 0.2932 |
| | 29 | 90.2 | 86 | 0.1880 |
| | 36 | 93.6 | 85 | 0.3522 |
| J-75M[b] | 9 | 96.9 | 86 | 0.6000 |
| | 9 | 78.0 | 71 | 0.0200 |
| | 15 | 98.1 | 85 | 0.4300 |
| | 18 | 84.4 | 76 | 0.0710 |
| | 24 | 97.8 | 86 | 0.3400 |
| | 24 | 97.7 | 82 | 0.2900 |
| | 36 | 79.6 | 84 | 0.0540 |
| | 38 | 98.2 | 80 | 0.0300 |
| | 40 | 94.1 | 86 | 0.0300 |
| | 41 | 97.3 | 86 | 0.0800 |

[a]J product with 12,000 centipoise viscosity in 2 weight percent aqueous solution, measured at 20 deg. C. with an Ubbelohde tube;
[b]J product with 75,000 centipoise viscosity;

Examples 14–27

The same apparatus and procedures were used as in Examples 1–13, with aqueous wash media (with an empirically-determined density in the liquid portion of each of 1.08 grams per cubic centimeter, and a sodium chloride content of about 14 weight percent) produced in the manufacture of Methocel™, Grade "K" hydroxypropyl methylcellulose ethers of varying viscosities. These results are shown in Table 2 as follows:

TABLE 2

| Product Type | Pressure Drop (lbs/in$^2$) | Pct. Recovery | Feed Temp. (Deg. C.) | Feed Conc. (Wt. % Solids) |
|---|---|---|---|---|
| K-4M[a] | 10 | 26.0 | 88 | 0.0435 |
| | 26 | 89.0 | 88 | 0.0200 |
| | 40 | 90.3 | 88 | 0.0100 |
| K-15M[b] | 10 | 50.1 | 86 | 0.0418 |
| | 16 | 60.4 | 88 | 0.0251 |
| | 22 | 58.5 | 90 | 0.0274 |
| | 22 | 52.2 | 84 | 0.0344 |
| | 29 | 79.8 | 88 | 0.0469 |
| | 29 | 51.8 | 84 | 0.0516 |
| | 31 | 69.6 | 87 | 0.0383 |
| | 31 | 63.9 | 72 | 0.0157 |
| | 36 | 61.5 | 84 | 0.0467 |
| | 37 | 72.7 | 88 | 0.0348 |
| | 41 | 46.0 | 85 | 0.0200 |

[a]K product with 4,000 centipoise viscosity in 2 weight percent aqueous solution, measured at 20 deg. C. with an Ubbelohde capillary viscometer tube;
[b]K product with 15,000 centipoise viscosity;

Examples 28–34

The apparatus and procedures of the previous examples were employed for several feeds at various concentrations of Methocel™ F-40M hydroxypropyl methylcellulose ether, having a bulk dry solids density of 0.33 grams/cm$^3$, from 27 to 30 weight percent of methoxyl substituents and from 4.0 to 7.5 weight percent of hydroxypropyl substituents, and a viscosity of 40,000 centipoise. The results of these runs are shown in Table 3:

TABLE 3

| Pressure Drop (lbs/in²) | Pct. Recovery | Feed Temp. (Deg. C.) | Feed Conc. (Wt. % Solids) |
|---|---|---|---|
| 10 | 17.5 | 78 | 0.0334 |
| 16 | 39.1 | 80 | 0.0302 |
| 17 | 31.2 | 80 | 0.0166 |
| 28 | 48.7 | 82 | 0.0231 |
| 31 | 38.5 | 80 | 0.0150 |
| 32 | 23.7 | 84 | 0.0146 |
| 38 | 25.1 | 81 | 0.0118 |

Example 35

Samples of a Methocel™ J-75M ("J" product having a viscosity of 75,000 centipoise) hydroxypropyl methylcellulose ether feed containing 490 parts per million by weight of undissolved cellulose ether solids, and of a corresponding overflow from the hydraulic cyclone of previous examples containing 168 parts per million by weight of undissolved cellulose ether solids (for a 65.7 percent removal of undissolved cellulose ether solids), were each diluted 2:1 by volume with water. To each sample was added 0.5 parts per million by weight of Foamtrol DK-1879 block copolymer antifoam (Betz Laboratories Inc.).

One hundred milliliters of the feed and overflow samples as thus prepared were placed in turn in a 500 mL graduated cylinder, and aspirated with 730 mL/minute of air for 15 seconds. The foam volume in the cylinder was measured as a function of time (from the conclusion of the aspiration), using a stop watch and reading the crest of the foam in the graduated cylinder. The results of these measurements are shown in Table 4, and demonstrate that removing as little as 65 percent of the undissolved cellulose ethers produced a less stable foam which rapidly broke down.

TABLE 4

| Sample | Time (Sec.) | Foam Volume (mL) |
|---|---|---|
| Feed | 0 | 250 |
| | 60 | 205 |
| | 180 | 195 |
| | 300 | 170 |
| | 600 | 60 |
| Overflow | 0 | 200 |
| | 60 | 70 |
| | 120 | 28 |
| | 180 | 20 |

Example 36

A sample of an aqueous wash medium was determined by gas chromatography and mass spectroscopy to contain 0.5 percent by weight of methanol, 1.25 percent of propylene glycol methyl ether, 1.9 percent of propylene glycol, 0.22 percent of dipropylene glycol methyl ether, 0.7 percent of dipropylene glycol, 0.09 percent of tripropylene glycol, 13 percent of sodium chloride and 2200 parts per million by weight of dissolved cellulose ethers, the balance being water.

The sample was acidified with hydrochloric acid to a pH of about 0, then heated in a differential scanning calorimeter capillary from 25 degrees Celsius to 250 degrees Celsius, at a 10 degrees Celsius/minute ramp.

On gas chromatographic and mass spectroscopic analysis of the materials treated in this fashion it was determined that the methanol, glycols and glycol ethers had been completely converted to products including methyl chloride, 1,3,5-trimethylbenzene and various isomers of trimethylcyclohexenone as the major products.

Example 37

The same aqueous wash medium as in Example 36 was acidified to a pH of 1, and heated in a differential scanning calorimeter capillary from 25 degrees Celsius to 350 degrees Celsius at a ramp rate of 10 degrees Celsius per minute.

On subsequent gas chromatographic and mass spectroscopic analysis, it was again determined that the methanol, glycols and glycol ethers had been fully converted, the major products produced under these conditions being 2-methyl-2-pentenal, isomers of trimethylcyclohexenone, dimethyl dioxane and 1,3,5-trimethylbenzene.

Example 38

A comparison was conducted for this example between the foaming and settling properties of a cellulose ether-containing wastewater stream which had not been acid hydrolyzed, and those properties of the same wastewater stream which had been acid hydrolyzed prior to being biologically treated. For this purpose a two-train miniplant was constructed in which each train consisted of three one-liter reactors in series followed by a small clarifier. The reactors were seeded with the microorganisms from an industrial wastewater facility.

A first stream containing 1000 parts per million by weight of Methocel™ F-4M hydroxypropyl methylcellulose ether ("F" product with a 4000 centipoise viscosity) in water was diluted 30:1 by volume with water (to produce a 30 ppm wastewater stream) and fed to one train over a two week period. A second stream, containing 1000 parts per million by weight of the same cellulose ether in water, was acid hydrolyzed with hydrochloric acid at 150 degrees Celsius and a pH of 1.0 over a period of an hour, then diluted 30:1 by volume with water before being fed to the second train over the same two week period.

Antifoam requirements for acceptable operation of the second train were 100th those of the first train. The clarifier bed on the first train experienced bed expansion, indicating that the microorganisms were being coated by the cellulose ether. The clarifier on the second train did not experience bed expansion, and clarifier performance was good.

Numerous embodiments of the invention have been described or exemplified herein. Those skilled in the art will recognize, however, that changes can be made to these embodiments which are nevertheless within the scope and spirit of the present invention as more particularly defined in the claims below.

What is claimed is:

1. A process for recovering hot water-insoluble cellulose ether solids from an aqueous slurry containing such cellulose ether solids, comprising:

directing the slurry into a hydraulic cyclone at a temperature above the gel point of the hot water-insoluble cellulose ether solids in the slurry;

selecting a pressure drop to be achieved across the hydraulic cyclone based on the density of the cellulose ether solids in the slurry; and applying a pressure to the slurry to achieve the selected selected pressure drop across the hydraulic cyclone.

2. A process as defined in claim 1, wherein the temperature of the slurry is maintained throughout the process at from about 70 degrees Celsius to about 100 degrees Celsius.

3. A process as defined in claim 2, wherein the temperature of the slurry is maintained throughout the process at from about 90 degrees Celsius to about 95 degrees Celsius.

4. A process as defined in claim 1, wherein the aqueous slurry is the aqueous wash medium from a filter wherein a portion of the hot water-insoluble cellulose ether solids have been recovered from the aqueous slurry from a reactor wherein such cellulose ether solids are produced, and wherein wash water has been applied to such recovered portion of cellulose ether solids.

5. A process as defined in claim 1, wherein at least a portion of the overflow from the hydraulic cyclone is fed directly to a biological wastewater treatment process.

6. A process as defined in claim 1, wherein at least a portion of the overflow from the hydraulic cyclone is treated to reduce the surfactant-like effect of the cellulose ethers contained therein in a biological wastewater treatment process by removal of some or all of the remaining cellulose ethers in the overflow or by chemical modification thereof, and the treated overflow is then fed to a biological wastewater treatment process.

7. A process as defined in claim 6, wherein at least a portion of the overflow from the hydraulic cyclone is acid hydrolyzed at a pH of about 2.0 or less and a temperature of from about 100 degrees Celsius to about 300 degrees Celsius over a period of from about 5 minutes to about an hour, prior to treatment in a biological wastewater treatment process.

8. A process as defined in claim 7, wherein the acid hydrolysis occurs at a pH of about 1.0 and a temperature of about 150 degrees Celsius over a period of about an hour.

9. A process as defined in claim 1, wherein the aqueous slurry is received from a reactor wherein such cellulose ether solids are produced and further wherein the underflow from the hydraulic cyclone is passed to a filter or centrifuge and a dryer in combination.

10. A process as defined in claim 9, wherein a first hydraulic cyclone is employed for receiving an aqueous slurry from the reactor, and a second hydraulic cyclone is employed for receiving an aqueous wash medium from said filter or centrifuge.

11. A process for recovering salable, hot water-insoluble cellulose ether solids in an aqueous slurry from a reactor wherein such cellulose ether solids are produced, or in an aqueous slurry from an apparatus wherein a portion of the cellulose ether solids from the reactor have been recovered, comprising:

adding dilution water to the slurry to increase the density difference between the hot water-insoluble cellulose ether solids in the slurry and the liquid portion of the slurry while increasing the temperature of the slurry; then separating out hot water-insoluble cellulose ether solids from the slurry in a hydraulic cyclone, at a temperature above the gel point of the hot water-insoluble cellulose ether solids.

12. A process as defined in claim 11, wherein the temperature of the slurry is maintained throughout the process at from about 70 degrees Celsius to about 100 degrees Celsius.

13. A process as defined in claim 12, wherein the temperature of the slurry is maintained throughout the process at from about 90 degrees Celsius to about 95 degrees Celsius.

14. A process as defined in claim 11, wherein the aqueous slurry is the aqueous wash medium from a filter wherein a portion of the hot water-insoluble cellulose ether solids have been recovered from the aqueous slurry from the reactor and wherein wash water has been applied to such recovered portion of cellulose ether solids.

15. A process as defined in claim 11, wherein at least a portion of the overflow from the hydraulic cyclone is fed directly to a biological wastewater treatment process.

16. A process as defined in claim 11, wherein at least a portion of the overflow from the hydraulic cyclone is treated to reduce the surfactant-like effect of the cellulose ethers contained therein in a biological wastewater treatment process by removal of some or all of the remaining cellulose ethers in the overflow or by chemical modification thereof, and the treated overflow is then fed to a biological wastewater treatment process.

17. A process as defined in claim 16, wherein at least a portion of the overflow from the hydraulic cyclone is acid hydrolyzed at a pH of about 2.0 or less and a temperature of from about 100 degrees Celsius to about 300 degrees Celsius over a period of from about 5 minutes to about an hour, prior to treatment in a biological wastewater treatment process.

18. A process as defined in claim 17, wherein the acid hydrolysis occurs at a pH of about 1.0 and a temperature of about 150 degrees Celsius over a period of about an hour.

19. A process as defined in claim 11, wherein the aqueous slurry is received from the reactor and further wherein the underflow from the hydraulic cyclone is passed to a filter or centrifuge and a dryer in combination.

20. A process as defined in claim 19, wherein a first hydraulic cyclone is employed for receiving an aqueous slurry from the reactor, and a second hydraulic cyclone is employed for receiving an aqueous wash medium from said filter or centrifuge.

21. A process as defined in claim 11, wherein the dilution water is process water which has been passed through a bed of ion exchange resin to exchange sodium ions for magnesium and calcium ions in the process water associated with scale formation.

22. A process for recovering salable, hot water-insoluble cellulose ether solids in an aqueous slurry from a reactor wherein such cellulose ether solids are produced, or in an aqueous slurry from an apparatus wherein a portion of the cellulose ether solids from the reactor have been recovered, comprising:

adding salt to the slurry to cause a portion of the hot water-soluble cellulose ethers in the slurry to precipitate out from the liquid portion of the slurry, while applying additional pressure to the slurry to compensate for the accompanying reduced density difference between the liquid portion of the slurry and the undissolved cellulose ethers contained in such slurry; then separating out hot water-insoluble cellulose ether solids from the slurry in a hydraulic cyclone, at a temperature above the gel point of the hot water-insoluble cellulose ether solids.

23. A process as defined in claim 22, wherein the temperature of the slurry is maintained throughout the process at from about 70 degrees Celsius to about 100 degrees Celsius.

24. A process as defined in claim 23, wherein the temperature of the slurry is maintained throughout the process at from about 90 degrees Celsius to about 95 degrees Celsius.

25. A process as defined in claim 22, wherein the aqueous slurry is the aqueous wash medium from a filter wherein a portion of the hot water-insoluble cellulose ether solids have been recovered from the aqueous slurry from the reactor and wherein wash water has been applied to such recovered portion of cellulose ether solids.

26. A process as defined in claim 22, wherein at least a portion of the overflow from the hydraulic cyclone is fed directly to a biological wastewater treatment process.

27. A process as defined in claim 22, wherein at least a portion of the overflow from the hydraulic cyclone is treated to reduce the surfactant-like effect of the cellulose ethers contained therein in a biological wastewater treatment process by removal of some or all of the remaining cellulose ethers in the overflow or by chemical modification thereof, and the treated overflow is then fed to a biological wastewater treatment process.

28. A process as defined in claim 27, wherein at least a portion of the overflow from the hydraulic cyclone is acid hydrolyzed at a pH of about 2.0 or less and a temperature of from about 100 degrees Celsius to about 300 degrees Celsius over a period of from about 5 minutes to about an hour, prior to treatment in a biological wastewater treatment process.

29. A process as defined in claim 28, wherein the acid hydrolysis occurs at a pH of about 1.0 and a temperature of about 150 degrees Celsius over a period of about an hour.

30. A process as defined in claim 22, wherein the aqueous slurry is received from the reactor and further wherein the underflow from the hydraulic cyclone is passed to a filter or centrifuge and a dryer in combination.

31. A process as defined in claim 30, wherein a first hydraulic cyclone is employed for receiving an aqueous slurry from the reactor, and a second hydraulic cyclone is employed for receiving an aqueous wash medium from said filter or centrifuge.

32. In a process for producing cellulose ethers which comprises reacting cellulose, an alkali metal hydroxide and at least one etherifying agent in an aqueous medium which may contain one or more organic solvents, washing the cellulose ether product from the reactor to a solids separation device with hot water at a temperature above the gel or flocculation point of the cellulose ether product in the form of a slurry, and employing the solids separation device to recover cellulose ether solids from the slurry, the improvement comprising acid hydrolyzing a resulting wastewater stream from the process which contains cellulose ethers at a pH of about 2.0 or less and a temperature of from about 100 degrees Celsius to about 300 degrees Celsius over a period of from about 5 minutes to about an hour, and then treating the acid hydrolyzed wastewater stream in a biological wastewater treatment process.

33. A process as defined in claim 32, wherein the acid hydrolysis occurs at a pH of about 1.0 and a temperature of about 150 degrees Celsius over a period of about an hour.

\* \* \* \* \*